United States Patent [19]

Maginnis, Jr.

[11] Patent Number: 5,693,880
[45] Date of Patent: Dec. 2, 1997

[54] HEATER WITH TAPERED HEATER DENSITY FUNCTION FOR USE WITH MASS FLOWMETER

[75] Inventor: Thomas O. Maginnis, Jr., Dracut, Mass.

[73] Assignee: MKS Instruments, Inc., Andover, Mass.

[21] Appl. No.: 664,141

[22] Filed: Jun. 14, 1996

[51] Int. Cl.$^6$ ........................... G01F 1/68
[52] U.S. Cl. .................... 73/202.5; 73/202.25
[58] Field of Search .................. 73/204.22, 204.26, 73/205, 204.21, 202.5, 202.25, 204.12, 204.15, 204.17, 204.27

[56] References Cited

U.S. PATENT DOCUMENTS

| | | | |
|---|---|---|---|
| 3,938,384 | 2/1976 | Blair | 73/204 |
| 4,464,932 | 8/1984 | Ewing et al. | |
| 4,519,246 | 5/1985 | Hartemink | 73/202.5 |
| 4,548,075 | 10/1985 | Mariano | 73/202.5 |
| 5,036,701 | 8/1991 | van der Graaf | |
| 5,142,907 | 9/1992 | Hinkle | |
| 5,259,243 | 11/1993 | Drexel | 73/204.25 |
| 5,398,549 | 3/1995 | Suzuki | |
| 5,461,913 | 10/1995 | Hinkle et al. | |
| 5,511,416 | 4/1996 | Shambayati | 73/204.21 |

*Primary Examiner*—Richard Chilcot
*Assistant Examiner*—Jewel V. Artis
*Attorney, Agent, or Firm*—Lappin & Kusmer LLP

[57] ABSTRACT

The disclosed flowmeter includes a sensor tube and a heater. The sensor tube defines an input end, an output end, and an interior channel extending from the input end to the output end and permits fluid to flow from the input end through the channel to the output end. The heater includes a first end and a second end, and the heater establishes a non-uniform heater density function between the first and second ends. The heater is disposed proximal to the sensor tube for heating the tube.

24 Claims, 5 Drawing Sheets

HEATER WITH TAPERED HEATER DENSITY FUNCTION FOR USE WITH MASS FLOWMETER

FIELD OF THE INVENTION

The present invention relates generally to mass flowmeters. More particularly, the invention relates to an improved heater that provides a non-uniform tapered heater density function for use with mass flowmeters.

BACKGROUND OF THE INVENTION

FIG. 1 shows a partially sectional view of a prior art mass flowmeter 100, which includes a bypass tube 110, a sensor tube 112, an upstream heater coil 114, a downstream heater coil 116, a laminar flow element (LFE) 118, and a thermal clamp 120. One end of bypass tube 110 defines an input port 122, and the other end of bypass tube 110 defines an output port 124 so that a fluid 126 may flow from the input port to the output port in a downstream direction indicated by arrows 128. LFE 118 is disposed within bypass tube 110 for restricting the flow of fluid 126 through tube 110. An upstream end of sensor tube 112 couples to bypass tube 110 between input port 122 and LFE 118 and a downstream end of sensor tube 112 couples to bypass tube 110 between LFE 118 and output port 124. A fixed proportion of the total mass of fluid flowing from the input port to the output port flows through sensor tube 112. Sensor tube 112 is typically (but not necessarily) of capillary dimensions (e.g., having an inner diameter of 0.012 inches and an outer diameter of 0.018 inches), and is fabricated from material characterized by a relatively high thermal conductivity (e.g., steel) in comparison to the thermal conductivity of the fluid 126.

Each of the heater coils 114, 116 includes a thermally sensitive resistive conductor that is uniformly wound, as densely as possible, around a respective portion of sensor tube 112, each successive turn of the conductors being placed as close as possible to the previous turn and wound at a constant pitch. Each of the heater coils 114, 116 extends axially, for a length L, along a respective portion of sensor tube 112. Downstream heater coil 116 is disposed downstream of heater coil 114. The coils abut one another, or are separated by a relatively small gap for manufacturing convenience, and are electrically connected, at the center of the tube 112. Each heater coil provides an electrical resistance that varies according to a function of the heater coil's temperature. The temperature of each heater coil varies in turn according to a function of the electrical current flowing through its resistive conductor, and also according to a function of the mass flow rate within the sensor tube 112. Thus, each of the heater coils 114, 116 forms a heater/sensor: the coil acts as a heater that generates heat according to a function of the electrical current flowing through the coil, and the coil acts as a sensor allowing the temperature of the coil to be measured according to a function of the electrical resistance provided by the coil. For convenience of illustration, the conductors of heater coils 114, 116 are not drawn to scale, and the diameter of these conductors is typically much smaller, relative to the sensor tube 112, than is depicted in the drawings.

Flowmeter 100 also includes an electronic measuring circuit 132. The upstream end of heater coil 114 is electrically connected to circuit 132 via a wire 134, the node electrically connecting the downstream end of heater coil 114 and the upstream end of heater coil 116 is electrically connected to circuit 132 via a wire 136, and the downstream end of heater coil 116 is electrically connected to circuit 132 via a wire 138.

Thermal clamp 120, which may be part of a casing for flowmeter 100, defines an aperture 130 and encloses heater coils 114, 116 within aperture 130. Thermal clamp 120 is mounted to and makes good thermal contact with sensor tube 112 near the upstream end of heater coil 114 and near the downstream end of heater coil 116.

In operation, fluid 126 flows from the input port 122 to the output port 124 and a portion of the fluid flows through restrictive LFE 118. The remaining fluid flows through sensor tube 112. Circuit 132 causes an electrical current to flow through heater coils 114, 116 so that heater coils 114, 116 generate and apply heat to sensor tube 112, as well as to the fluid 126 flowing through sensor tube 112. The fluid 126, which is normally at ambient temperature prior to entering input port 122, conducts heat away from the heater coils 114, 116 as it flows through sensor tube 112. Since the upstream heater coil 114 transfers some heat to fluid 126 before the fluid reaches the portion of the sensor tube 112 enclosed by the downstream heater coil 116, the fluid 126 conducts more heat away from heater coil 114 than it conducts away from heater coil 116. The difference in the amount of heat conducted away from the two heater coils 114, 116 is indicative of the mass flow rate of the fluid 126 through sensor tube 112. Circuit 132 measures the difference in the amount of heat conducted away from the heater coils 114, 116 by sensing their respective electrical resistances and generates an output signal that is representative of the mass flow rate of the fluid 126 flowing through sensor tube 112. Since the mass flow through sensor tube 112 is a fixed portion of the total amount of mass flowing from the input port 122 to the output port 124, this output signal is also representative of the total mass flow through flowmeter 100. U.S. Pat. No. 5,461,913, issued to Hinkle et al. on Oct. 31, 1995, which is assigned to the present assignee, discloses one form of the measuring circuit 132 that may be used with flowmeter 100.

Thermal clamp 120, which is typically fabricated from a material characterized by a relatively high thermal conductivity compared to the thermal conductivity of sensor tube 112, makes good thermal contact with the portion of sensor tube 112 just downstream of heater coil 116 and the portion of sensor tube 112 just upstream of heater coil 114. So thermal clamp 120 encloses and protects heater coils 114, 116, and also thermally anchors, at or near the ambient temperature, the portions of sensor tube 112 just upstream of heater coil 114 and just downstream of heater coil 116. One problem with prior art flowmeter 100 is that its performance is very sensitive to small variations in the position of thermal clamp 120. This has made it difficult to manufacture large quantities of flowmeter 100 that all share the same, or nearly the same, performance characteristics.

It would be advantageous to produce a flowmeter that is relatively insensitive to small variations in the position of thermal clamp 120. In the past however, this has not been considered possible since the reasons for the flowmeter's sensitivity to variations in the position of thermal clamp 120 have not been well understood.

OBJECTS OF THE INVENTION

It is an object of the present invention to substantially reduce or overcome the above-identified problems of the prior art.

Another object of the present invention is to provide an improved mass flowmeter that is relatively insensitive to the position of the thermal clamp.

And another object of the present invention is to provide an improved flowmeter that is relatively insensitive to temperature disturbances occurring along the sensor tube.

Yet another object of the present invention is to provide an improved flowmeter of increased sensitivity that provides the same or improved performance over that of prior art flowmeters, for a specified input power of the heater.

Still another object of the present invention is to provide an improved flowmeter that generates a non-uniform heater density function along a portion of the sensor tube.

And yet another object of the present invention is to provide an improved flowmeter that generates a heater density function that is characterized by an inverted "V" shape along the sensor tube.

And another object of the present invention is to provide an improved flowmeter that generates a heater density function that is characterized by an arch of a cosine function along the sensor tube.

And still another object of the present invention is to provide an improved flowmeter that generates a heater density function along a portion of the sensor tube so that the temperature at the ends of the portion is equal or nearly equal to the ambient temperature.

And yet another object of the present invention is to provide an improved flowmeter that generates a heater density function that includes a substantially linear increasing portion and a substantially linear decreasing portion.

And still another object of the present invention is to provide an improved flowmeter that generates a heater density function along a portion of the sensor tube so that the first derivative with respect to the axial position of the heater density function is non-zero for the majority of the portion.

And yet another object of the present invention is to provide an improved flowmeter that generates a heater density function along a portion of the sensor tube so that the second derivative with respect to axial position of the heater density function is substantially equal to zero for the majority of the portion.

And still another object of the present invention is to provide an improved flowmeter that transfers heat between the sensor tube and a fluid flowing through the tube at a substantially constant rate independent of axial location along a portion of the sensor tube.

SUMMARY OF THE INVENTION

These and other objects are provided by an improved flowmeter including a sensor tube and a heater. The sensor tube defines an input end, an output end, and an interior channel extending from the input end to the output end and permits fluid to flow from the input end through the channel to the output end. The heater includes a first end and a second end, and the heater establishes a non-uniform heater density function between the first and second ends. As used herein, the term non-uniform heater density function means that the local heating power provided per unit length of tube is not substantially constant at least over a portion of the range of the function. The heater is disposed proximal to the sensor tube for heating the tube.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following derailed description taken in connection with the accompanying drawings in which the same reference numerals are used to indicate the same or similar parts wherein.

DETAILED DESCRIPTION OF THE DRAWINGS

Figure 1:
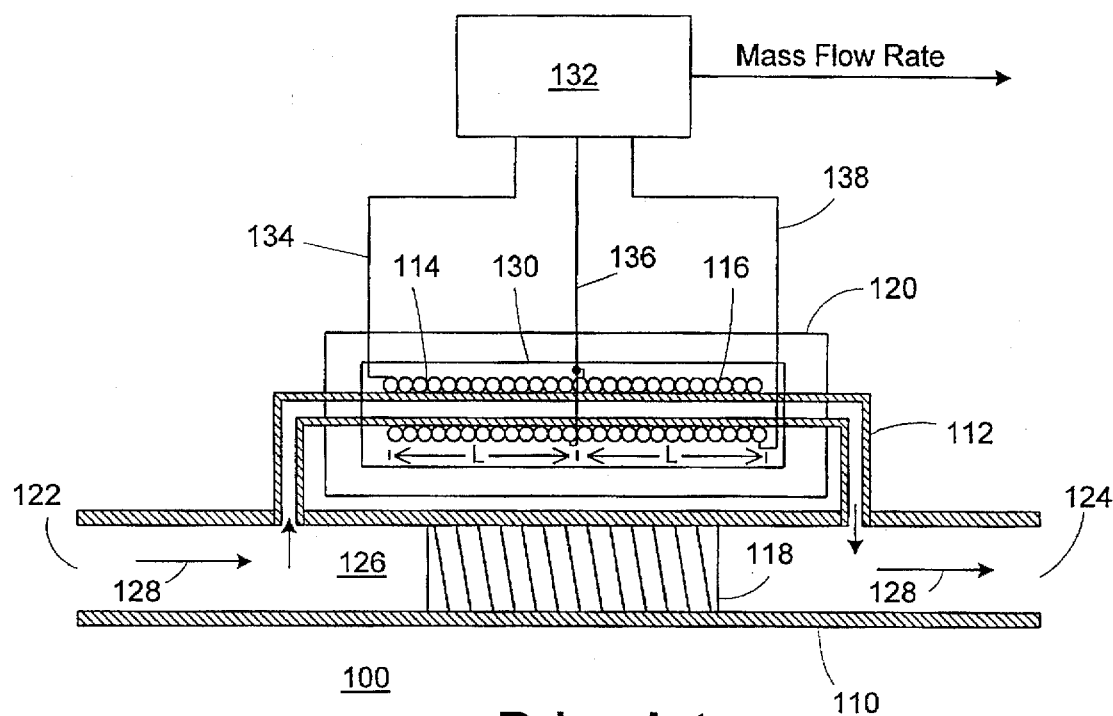
FIG. 1 shows a partial block diagram and partial radial cross-sectional view of a prior art flowmeter.
Figure 2:
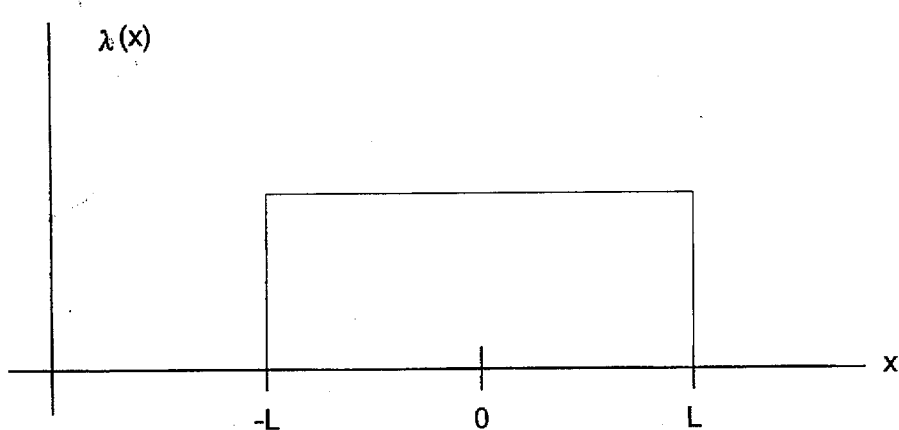
FIG. 2 shows a graph illustrating the heater density function used by the prior art flowmeter shown in FIG. 1.
Figure 3:
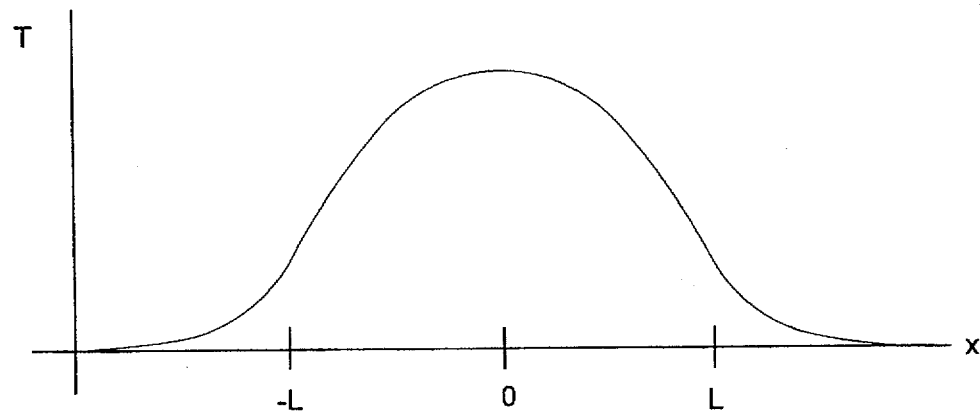
FIG. 3 shows a graph illustrating the temperature distribution of the sensor tube in the flowmeter shown in FIG. 1.
Figure 4:
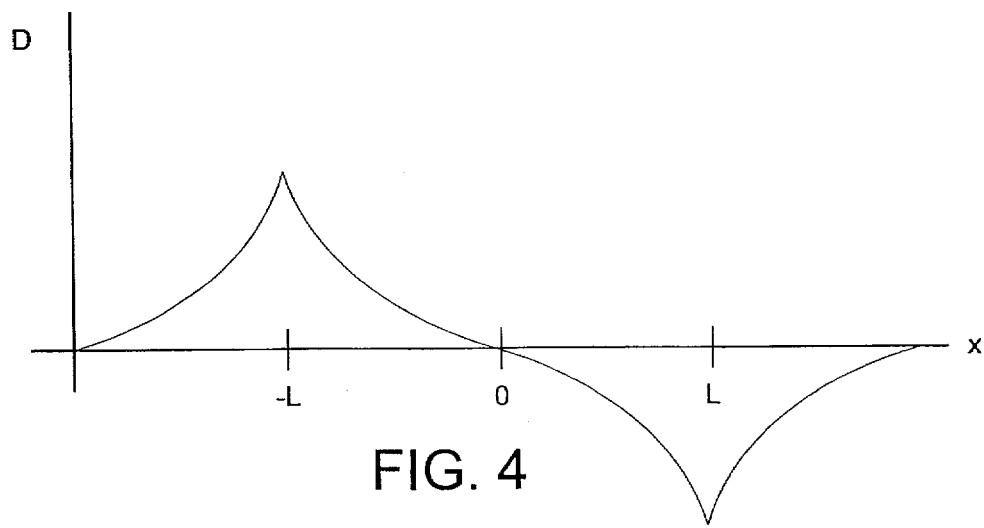
FIG. 4 shows a graph illustrating the distribution of the temperature difference between the sensor tube shown in FIG. 1 and a fluid flowing through the tube.

FIG. 2 shows a graph in which the Y-axis represents the heater density function (i.e., the heater power per unit length as may be measured in units of watts per meter) generated by heater coils 114, 116 of flowmeter 100 (shown in FIG. 1) and the X-axis represents axial position as measured along the sensor tube 112. The graph shown is for an embodiment of flowmeter 100 (a) that does not include thermal clamp 120, (b) in which heater coils 114, 116 abut at the origin of the X-axis and (c) in which the axial length of heater coil 114 and the axial length of heater coil 116 each equals L. FIGS. 3–4 show graphs for the same configuration as FIG. 2 in which the Y-axes represent temperature and the X-axes represent axial position as measured along the sensor tube 112 of flowmeter 100. As will be discussed in greater detail below, these graphs illustrate why prior art flowmeter 100 is so sensitive to the position of thermal clamp 120 as well as other disadvantages of prior art flowmeters.

FIG. 2 shows a graph of the uniform heater density function $\lambda(x)$ generated by heater coils 114, 116 shown as a function of x (where x represents distance or position as measured along the X-axis). Since the conductors of heater coils 114, 116 are uniformly wound around sensor tube 112, the heating power per unit length of the heater coils is substantially constant for all values of x between −L and L. $\lambda(x)$ is a uniform function because the heating power of the heater coils is substantially constant over the entire range of the function (i.e., from x=−L to x=L). FIG. 3 shows a graph of the temperature distribution of sensor tube 112 as a function of x when heater coils 114, 116 provide the uniform heater density function $\lambda(x)$ shown in FIG. 2 and when no fluid 126 is flowing through sensor tube 112. As shown in FIG. 3, the temperature distribution along sensor tube 112 is symmetrical and concave downwards. The maximum temperature of tube 112 is at the origin of the X-axis where heater coils 114, 116 abut or are joined. The temperature of tube 112 thus decreases as the distance from the origin increases. As seen, the temperature curve has a slope that is zero at the origin and that changes continuously with increasing distance away from the origin.

FIG. 4 shows a graph of the difference between the temperature of sensor tube 112 and the temperature of the fluid 126, as a function of x, when the fluid 126 is flowing through the tube 112. As shown in FIG. 4, the greatest temperature differences between the tube 112 and the fluid 126 occur at locations x=−L and x=L (i.e., at the upstream end of heater coil 114 and at the downstream end of heater coil 116). The temperature difference rapidly falls to zero for all values of x away from these locations. Since the amount of heat transferred between tube 112 and fluid 126 is proportional to their temperature difference, the greatest amount of heat transfer occurs at locations x=−L and x=L. Since flowmeter 100 operates by measuring the amount of heat transferred between tube 112 and fluid 126, any factors tending to disturb the temperature at locations x=−L and x=L will significantly affect the performance of flowmeter 100.

When thermal clamp 120 is added to flowmeter 100, it thermally anchors sensor tube 112 at or near the ambient temperature at locations x=(L+$\delta_1$), and x=(−L−$\delta_2$), where $\delta_1$ and $\delta_2$ are relatively small distances. So thermal clamp 120 thermally anchors sensor tube 112 at the ambient temperature just upstream of heater coil 114 and just downstream of heater coil 116, and thermal clamp 120 therefore significantly affects the temperature of tube 112 at locations x=L and x=−L. Any variations in the distances $\delta_1$ and $\delta_2$ will change the effect that thermal clamp 120 has on the temperatures at locations x=L and x=−L, and this explains why the performance of flowmeter 100 is so sensitive to the position of thermal clamp 120.

The graph shown in FIG. 4 also reveals other defects of prior art flowmeter 100. Since most of the heat transfer occurs at isolated locations (i.e., x=L and x=−L), the performance of flowmeter 100 is particularly sensitive to any variations in the performance of the heater coils at these locations, and such variations may be caused for example by a defect in the heater coils' conductors. Further, since most of the heat transfer occurs proximal to thermal clamp 120, much of the heat generated by the heater coils is wasted and is conducted away by thermal clamp 120 rather than being used to heat fluid 126.

Figure 5:
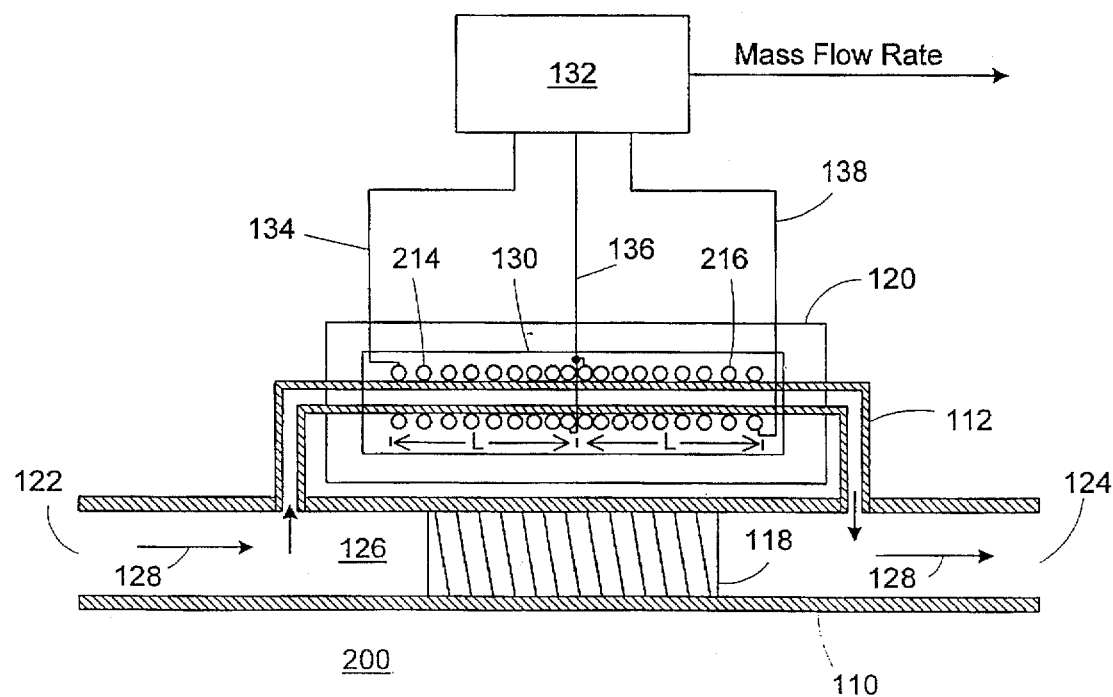
FIG. 5 shows a partial block diagram and partial radial cross-sectional view of a flowmeter constructed according to the invention.

FIG. 5 shows a partially sectional diagram of an improved flowmeter 200 constructed according to the invention. Improved flowmeter 200 is similar to prior art flowmeter 100, however, improved flowmeter 200 includes improved heater coils 214, 216 rather than heater coils 114, 116. Heater coils 214, 216 are wound in a non-uniform fashion around sensor tube 112 and are therefore characterized by a non-uniform heater density function, meaning that the local heating power per unit length of heater coils 214, 216 is not substantially constant over the length of the coils. As will be discussed in greater detail below, use of a non-uniform heater density function improves the performance of flowmeter 200. In the illustrated embodiment, the heater coils 214, 216 are shown abutting at the center of sensor tube 112, and each heater coil is shown extending axially, for a length of L, along a respective portion of sensor tube 112. However, those skilled in the art will appreciate that other arrangements of the heater coils 214, 216 are also embraced by the invention. In particular, a small gap may be introduced between upstream and downstream heating coils for ease of manufacture.

Figure 6:
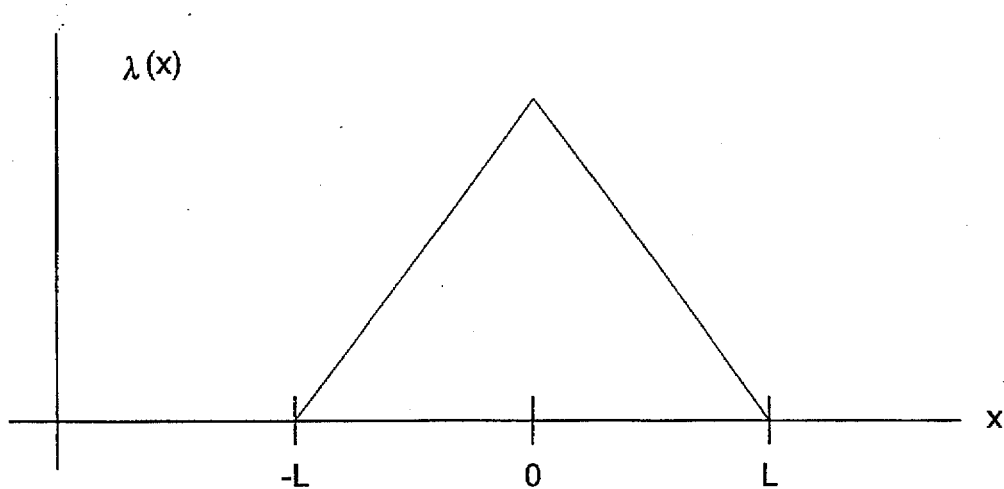
FIG. 6 shows a graph illustrating a preferred non-uniform heater density function for use with the flowmeter shown in FIG. 5.
Figure 7:
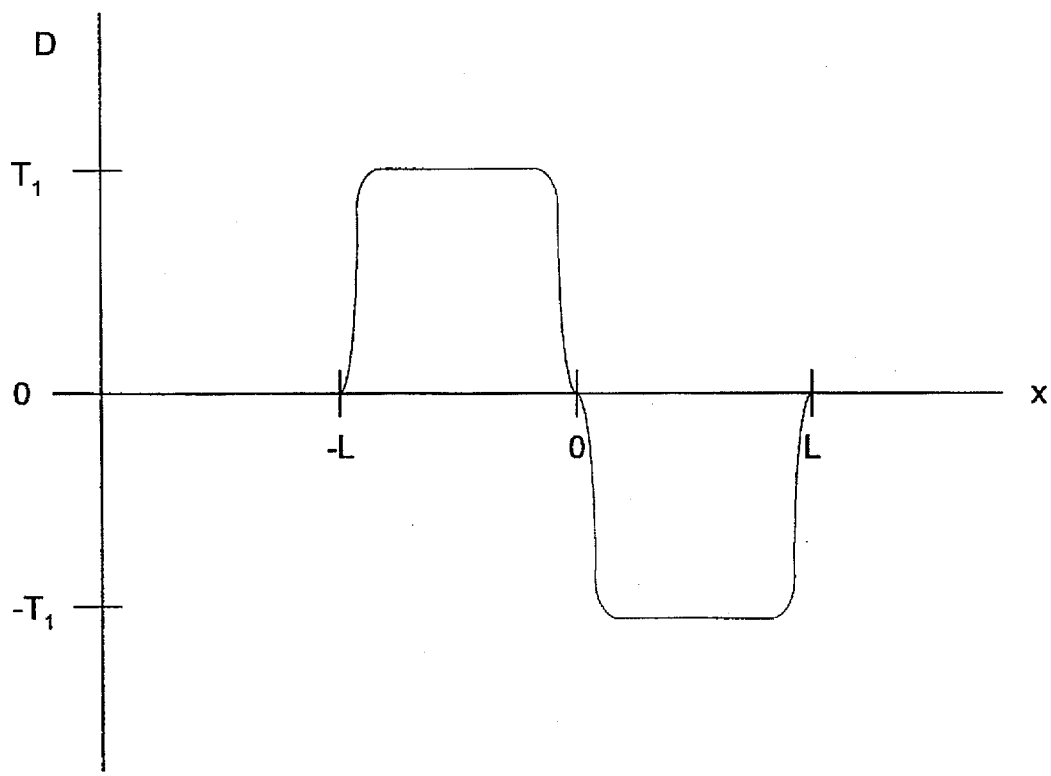
FIG. 7 shows a graph illustrating the distribution of the temperature difference between the sensor tube shown in FIG. 5 and a fluid flowing through the tube.

FIGS. 6 and 7 show graphs in which the X-axes represent distance as measured along the sensor tube 112 of flowmeter 200 (shown in FIG. 5) in an embodiment in which the heater coils 214, 216 abut at the origin of the X-axis, and in which the axial length of heater coil 214 and the axial length of heater coil 216 equals L. In FIG. 6 the Y-axis represents the heater density function (i.e., the local heater power per unit length) generated by heater coils 214, 216 and delivered to tube 112, and in FIG. 7 the Y-axis represents temperature. As will be discussed in greater detail below, these graphs illustrate the improved performance of flowmeter 200.

FIG. 6 shows a graph of a preferred non-uniform heater density function $\lambda(x)$ provided by heater coils 214, 216. $\lambda(x)$ is a non-uniform function because the local heating power per unit length of the coils 214, 216 is not substantially constant over the entire range of the function (i.e., between locations where x=−L and x=L). This heater density function is generally characterized by an inverted "V" shape, meaning that the function has a maximum value at x=0, and the function decreases as the absolute value of x increases from zero to L. This function $\lambda(x)$ may be referred to as a "tapered" function since it has a maximum value at an intermediate location (i.e., x=0), and the value of the function tends to decrease with increasing distance away from the intermediate location. This function $\lambda(x)$ is also continuous between x=−L and x=L, and is smooth at all points other than x=−L, x=0 and x=L. In one preferred form, the heater density function $\lambda(x)$ provided by heater coils 214, 216 is the piecewise linear function that is described by the following Equation (1)

$$\lambda(x) = \begin{cases} mx + mL + H_A & \text{for } -L \leq x \leq 0 \\ -mx + mL + H_A & \text{for } 0 \leq x \leq L \end{cases} \quad (1)$$

in which $H_A$ is a constant representing a constant reference heater density, the slope m is a constant, and L is the axial length of each of the heater coils 214, 216. So, the heater density of upstream heater coil 214 increases linearly and continuously from a minimum value of $H_A$ at its upstream end (i.e., at location x=−L) to a maximum value at its downstream end (i.e. at location x=0) as x increases from −L to the zero, and the heater density of downstream heater coil 216 decreases linearly and continuously from a maximum value at its upstream end (i.e., at location x=0) to a minimum value of $H_A$ at its downstream end (i.e., at location x=L) as x increases from the zero to L. The graph shown in FIG. 6 is also generally representative of the temperature distribution of sensor tube 112 when heater coils 214, 216 apply the heater density function $\lambda(x)$ shown in FIG. 6 to sensor tube 112.

In one preferred embodiment, the constant $H_A$ is substantially equal to zero, and the heater density function $\lambda(x)$ is selected so that the minimum temperature at the ends of the heaters (i.e., at locations x=−L and x=L) is equal to the ambient temperature. Alternatively, if the temperatures at the ends of the heater coils (i.e., at locations x=−L and x=L) are not exactly equal to the ambient temperature, it is preferable for them to be only slightly greater than the ambient temperature so that the temperature of the sensor tube will settle (without the assistance of thermal clamp 120) to the ambient temperature a relatively small distance away from these locations (i.e., at locations where x is slightly less than −L and where x is slightly greater than L). So, the temperature of sensor tube 112 is preferably equal or nearly equal to the ambient temperature for values of x less than or equal to −L and for values of x greater than or equal to L, and the temperature of sensor tube 112 increases from the ambient temperature to a maximum value as x increases from −L to zero, and the temperature of sensor tube 112 decreases from the maximum value to the ambient temperature as x increases from zero to L. Providing this temperature distribution to sensor tube 112 insures that flowmeter 200 will be insensitive to variations in the position of thermal clamp 120. As long as thermal clamp 120 attaches to portions of the sensor tube that are normally at or near the ambient temperature (i.e., upstream of heater coil 214 and downstream of heater coil 216), the thermal clamp 120 will not affect the heat transfer between sensor tube 112 and the fluid 126, and small variations in the position of thermal clamp 120 will not affect the performance of flowmeter 200. This insensitivity to the position of thermal clamp 120 facilitates manufacturing large numbers of flowmeter 200 that all provide the same performance characteristics.

FIG. 7 shows a graph of the distribution of the temperature difference between tube 112 and fluid 126 when the fluid 126 is flowing through improved flowmeter 200. The temperature difference between tube 112 and fluid 126 is equal, or nearly equal, to zero at location x=−L (i.e., at the upstream end of heater coil 214), and as x increases from −L to a value slightly larger than −L (i.e., at a location slightly downstream from the upstream end of heater coil 214) the temperature difference increases from zero to a value of $T_1$, where $T_1$ is dependent on the mass flow rate of the fluid 126 through tube 112. The temperature difference remains substantially constant at $T_1$ as x increases to a value slightly smaller than zero (i.e., at a location slightly upstream of the downstream end of heater coil 214). The temperature difference then decreases as x increases until the temperature difference reaches a value of $-T_1$ at a location where x is slightly greater than zero (i.e., at a location slightly downstream of the upstream end of heater coil 216). The temperature difference then remains substantially constant at $-T_1$ as x increases to a value slightly less than L (i.e., at a location slightly upstream of the downstream end of heater coil 216). The temperature difference then increases to zero as x increases to L.

So, the temperature difference between sensor tube 112 and fluid 126 is substantially equal to the constant value of $T_1$ for the majority of the length of upstream heater coil 214 (i.e, from slightly downstream of the upstream end of heater coil 214 to slightly upstream of the downstream end of heater coil 214), and the temperature difference is substantially equal to the constant value $-T_1$ for the majority of the length of downstream heater coil 216 (i.e, from slightly downstream of the upstream end of heater coil 216 to slightly upstream of the downstream end of heater coil 216). Fluid 126 therefore tends to cool upstream heater coil 214 and tends to warm downstream heater coil 216, and heat is transferred at a substantially constant rate from upstream heater coil 214 to fluid 126 along most of the length of heater coil 214, and heat is transferred at a substantially constant rate from fluid 126 to downstream heater coil 216 along most of the length of heater coil 216. Whereas in prior art flowmeter 100 (shown in FIG. 1) the heat transfer between tube 112 and fluid 126 is concentrated at isolated points (i.e., at locations x=−L and x=L), in improved flowmeter 200 the heat transfer is evenly distributed along most of the length of heater coils 214, 216. Improved flowmeter 200 therefore provides greater control over the heat transfer between sensor tube 112 and fluid 126 than does prior art flowmeter 100. Any temperature disturbances at isolated locations of flowmeter 200, which may occur for example as a result of a defect in the conductor of one of the heater coils 214, 216, will not radically affect the performance of flowmeter 200, whereas prior art flowmeter 100 is very sensitive to any temperature disturbances at locations x=−L and x=L.

Improved flowmeter 200 provides improved performance by preferably using heater coils 214, 216 to generate a tapered heater density function $\lambda(x)$ that is characterized by an inverted "V" shape as shown in FIG. 6, and the heater density function is preferably selected so that the temperature of sensor tube 112 is preferably equal, or nearly equal, to the ambient temperature at locations x=−L and x=L. Desired characteristics of the non-uniform heater density function $\lambda(x)$ may be appreciated by evaluating the equations that describe the thermal dynamics of flowmeter 200. The following Equations (2) and (3) are coupled differential equations that describe the thermodynamic relationships between sensor tube 112, heater coils 214, 216, and the fluid 126 flowing through flowmeter 200.

$$-\kappa A \frac{\partial^2 T}{\partial x^2} + \rho C A \frac{\partial T}{\partial t} + h(T - T_F) + h'(T - T_0) = \lambda(x,t) \quad (2)$$

$$-\kappa_F A_F \frac{\partial^2 T_F}{\partial x^2} + \dot{m} C_F \frac{\partial T_F}{\partial x} + \rho_F A_F C_F \frac{\partial T_F}{\partial t} + h(T_F - T) = hT_v \quad (3)$$

In Equations (2) and (3), $\kappa$ equals the thermal conductivity of sensor tube 112; $\kappa_F$ equals the thermal conductivity of the fluid 126; A equals the external cross-sectional area of the sensor tube 112; $A_F$ equals the area of a cross-sectional element of the fluid 126 within the sensor tube 112 (i.e., the internal cross-sectional area of the sensor tube); T describes the temperature of the sensor tube 112 as a function of x (or distance) along the length of the tube; $T_F$ describes the temperature of the fluid 126 as a function of x; $T_0$ is the ambient temperature of the volume surrounding the sensor tube 112; $\rho$ is the mass density of the sensor tube 112; $\rho_F$ is the mass density of the fluid 126; C is the specific heat of the sensor tube 112; $C_F$ is the specific heat of the fluid 126; h is a heat transfer coefficient between the tube 112 and the fluid 126 (at the interface between the tube and the fluid, i.e., at the inner diameter of the tube 112); h' is a heat transfer coefficient between the tube 112 and the external environment; +e,sez m+hu °+ee is the mass flow rate of the fluid 126; $\lambda$ describes the heat supplied locally per unit length by heater coils 214, 216 as a function of x and time (t); and $T_v$ represents the effect of viscous heating (which is normally relatively small and which increases with increases in the fluid flow as well as with increases in the viscosity of the fluid 126).

Equations (2) and (3) may be combined and manipulated algebraically to produce a higher order equation for the temperature difference $D(x)=T(x)-T_F(x)$ between tube 112 and fluid 126 as a function of axial position x, in the steady state. This higher order equation possesses a source term that is dependent upon the functional form of the heater density function, and that primarily determines the temperature difference distribution as a function of axial position. The source term is given by the following Expression (4):

$$-(1-K^2)T_v + \frac{1}{(h+h')}\left[ L_1 \frac{d\lambda(x)}{dx} - L_3^2 \frac{d^2\lambda(x)}{dx^2} \right] \quad (4)$$

In Expression (4), the terms $K^2$, $L_1$, and $L_3$ are as described in the following Equations (5–7):

$$K^2 = \frac{h}{(h+h')} \quad (5)$$

$$L_1 = \frac{\dot{m} C_F}{h} \quad (6)$$

$$L_3 = \sqrt{\frac{A_F K_F}{h}} \qquad (7)$$

To maximize the sensitivity of flowmeter 200, the heater density function $\lambda(x)$ should be selected so as to maximize flow dependent terms (i.e., terms that vary according to a function of the amount of fluid flowing through flowmeter 200) in Expression (4), and so as to minimize flow independent terms in Expression (4). Such a heater density function $\lambda(x)$ will minimize any heat transfer that occurs independently from the fluid flow and will thereby increase the accuracy of the flowmeter 200 by increasing the sensitivity of the flowmeter to fluid flow. In Expression (4), the heater density function $\lambda(x)$ appears only in the form of first and second derivatives with respect to x, the first derivative being multiplied by $L_1$ and the second derivative being multiplied by $(L_3)^2$. There is no term proportional to $\lambda(x)$ itself. Thus, a spatially constant, or uniform, heater density function can produce no flow dependent difference in temperature between tube and fluid, except such as may occur due to the abrupt transition in heater density at the ends of the heater region. As shown by Equations (6) and (7), $L_1$ is flow dependent, whereas $L_3$ is flow independent. Therefore in order, to maximize sensitivity, the heater density function $\lambda(x)$ is selected so that its first derivative with respect to x is non-zero for the entire length of the heater coils 214, 216 (to insure that the flow dependent term including $L_1$ is non-zero) and so that its second derivative with respect to x is substantially equal to zero for the entire length of the heater coils 214, 216 (to cancel the flow independent term that includes $L_3$). Linear functions are characterized by non-zero first derivatives and zero second derivatives, so it is preferable for the heater density function $\lambda(x)$ to include large portions that are substantially linear with respect to x. Such a heater density function maximizes the flowmeter's accuracy by minimizing any flow independent heat transfers.

As stated above, it is desirable for flowmeter 200 to be relatively insensitive to the position of thermal clamp 120, and one way to achieve such insensitivity is to insure that the temperature of tube 112 is equal or close to the ambient temperature at locations x=−L and x=L. This provides an additional constraint on the heater density function $\lambda(x)$. Thus, one preferred heater density function $\lambda(x)$ is equal or nearly equal to zero at locations x=−L and x=L, and has a non-zero first derivative and a zero second derivative for all, or at least most, values of x between locations x=−L and x=L. One function that satisfies most of these constraints is the function described by the above Equation (1) and illustrated in FIG. 6.

However, one problem with the function described by Equation (1) is that its second derivative is non-zero at locations x=−L, x=0, and x=L. For relatively low mass flows, when the flow dependent heat transfer terms are very small, the non-zero second derivative flow independent term could tend to dominate the heat transfer between sensor tube 112 and fluid 126 and thereby disturb the accuracy of flowmeter 200 for low flows.

The second derivative of the function $\lambda(x)$ described in Equation (1) is non-zero at locations x=−L, x=0, and x=L because the slope (or the first derivative) of $\lambda(x)$ changes discontinuously at these locations. To minimize the effect of the non-zero portion of the second derivative of $\lambda(x)$, it may be desirable to modify Equation (1) to include finite width "slope matching regions" near locations x=−L, x =0, and x=L to insure that the first derivative of $\lambda(x)$ is continuous over the entire range of x between −L and L. It may also be desirable to modify Equation (1) so that the higher order derivatives (e.g., the second or fourth order derivatives) of $\lambda(x)$ are also continuous. As those skilled in the art will appreciate, including such "slope matching regions" is generally equivalent to "smoothing" or "rounding" the "corners" of the graph shown in FIG. 6. There are many such ways to modify Equation (1) so as to preserve the inverted "V" shape of $\lambda(x)$, and to preserve the linear nature of $\lambda(x)$ for the majority of the range between x=−L and x=L, and to insure that the magnitude of the second derivative of $\lambda(x)$ never exceeds a desired threshold. Inclusion of such "slope matching regions" may increase the cost of fabricating heater coils 214, 216, and may thereby lead to a tradeoff between the desirability of fabricating a flowmeter that is highly accurate for relatively low flows and the desirability of fabricating an inexpensive flowmeter.

This analysis of the preferred heater density function $\lambda(x)$ also reveals additional deficiencies in the prior art flowmeter 100 (shown in FIG. 1) which uses the uniform heater density function illustrated in FIG. 2. The first derivative of this heater density function is zero everywhere except at locations x=−L and x=L, and at these locations the second derivative is also non-zero. So the heat transfer in prior art flowmeter 100 is largely unstable and is also largely dependent upon flow independent factors, so any flowmeter using the uniform heater density function shown in FIG. 2 is only capable of providing limited accuracy.

As stated above, flowmeter 200 is advantageous since it provides improved insensitivity to the position of thermal clamp 120, and since it provides improved insensitivity to isolated temperature disturbances, which may be caused for example by defects in the heater coils. Flowmeter 200 also advantageously heats the fluid 126 to a higher temperature than is achieved by prior art flowmeter 100 (shown in FIG. 1) using the same input power. Prior art flowmeter 100 transfers most of the heat to fluid 126 at locations near the ends of the heater coils (i.e., at locations x=−L and x=L), and thermal clamp 120 thermally anchors portions of the sensor tube 112 very near to these locations. So much of the heat generated by heater coils 114, 116 is conducted away by thermal anchor 120 rather than being applied to fluid 126. In contrast to the prior art, in improved flowmeter 200 thermal clamp 120 conducts only a relatively small mount of heat, or no heat, away from sensor tube 112 and substantially all of the heat generated by the heaters is applied to fluid 126. So for the same power, improved flowmeter 200 applies increased heat to fluid 126 and thereby increases the sensitivity and accuracy of flowmeter 200. Further, the uniform heater density function $\lambda(x)$ illustrated in FIG. 2 and used by prior art flowmeter 100 is discontinuous at the ends of the heaters (i.e., at locations x=−L and x=L) and these discontinuities cause instabilities in the operation of flowmeter 100, whereas the non-uniform heater density function illustrated in FIG. 6 and used by flowmeter 200 is continuous from minus infinity to infinity. Since the temperature of fluid 126 changes gradually along the length of sensor tube 112 in improved flowmeter 200, flowmeter 200 is less likely than prior art flowmeter 100 to excite any latent flow or thermal instabilities in the flowing fluid 126.

As illustrated in FIG. 5, one way to implement heater coils 214, 216 so that they the provide the desired non-uniform heater density function $\lambda(x)$ is to space the windings of coils 214, 216 non-uniformly i.e., with a non-uniform pitch. The following table describes one example of a way to produce heater coils 214, 216 that will provide a workable approximation to the heater density function $\lambda(x)$ described by Equation (1). The table lists an example of the desired pitch (in inches) between each turn of the preferral heater coils where the zeroth turn is at the junction of the two heater coils (i.e., at location x=0) and higher number rams are increasingly further away from the junction of the heater coils.

| Pitch (in inches) | Number of turns |
| --- | --- |
| 0.0014 | 0–9 |
| 0.0015 | 10–26 |
| 0.0016 | 27–40 |
| 0.0017 | 41–52 |
| 0.0018 | 53–62 |
| 0.0019 | 63–70 |
| 0.0020 | 71–78 |
| 0.0021 | 79–84 |
| 0.0022 | 85–90 |
| 0.0023 | 91–94 |
| 0.0024 | 95–99 |
| 0.0025 | 100–102 |
| 0.0026 | 103–106 |
| 0.0027 | 107–109 |
| 0.0028 | 110–112 |
| 0.0029 | 113–114 |
| 0.0030 | 115–116 |
| 0.0031 | 117–118 |
| 0.0032 | 119–120 |
| 0.0033 | 121 |
| 0.0034 | 122–123 |
| 0.0035 | 124 |
| 0.0036 | 125 |
| 0.0037 | 126–127 |
| 0.0038 | 128 |
| 0.0039 | 129 |
| 0.0041 | 130 |
| 0.0042 | 131 |
| 0.0043 | 132 |
| 0.0045 | 133 |
| 0.0046 | 134 |
| 0.0048 | 135 |
| 0.0050 | 136 |
| 0.0052 | 137 |
| 0.0055 | 138 |
| 0.0058 | 139 |
| 0.0062 | 140 |
| 0.0066 | 141 |
| 0.0072 | 142 |
| 0.0080 | 143 |
| 0.0090 | 144 |
| 0.0107 | 145 |
| 0.0139 | 146 |
| 0.0260 | 147 |

The above table assumes that the outer diameter of sensor tube 112 is substantially equal to 0.018 inches, the diameter of the resistive conductor used to produce heater coils 214, 216 is substantially equal to 0.0014 inches, and the resistive conductor is fabricated from an alloy with a relatively high temperature coefficient of resistance (e.g., 3,500 parts per million per degree C.°). Each heater coil in the above example includes 148 turns around the sensor tube. The total wire length is approximately 8.384 inches, and the axial winding length on the tube (L) is approximately 0.405 inches.

As discussed above, one preferred form of the heater density function $\lambda(x)$ is shown by FIG. 6 and described by the above Equation (1), and this heater density function will maximize the steady state sensitivity of flowmeter 200. However, this heater density function may not optimize the time response of flowmeter 200 (i.e., the time required for flowmeter 200 to respond to a change in the mass flow rate). This non-optimal time response may be understood by considering a Fourier expansion of the inverted "V" shaped heater density function shown in FIG. 6. The Fourier expansion of this heater density function will include several terms having significant (i.e., non-neglectable) amplitudes, and each of these terms will contribute to the time response of flowmeter 200 with a different time constant. As is known in the art, flowmeters may use "phase lead" (or "speed up") circuits to partially compensate for an undesirably slow time response, and such phase lead circuits may be incorporated into circuit 132 (shown in FIG. 5). However, use of such phase lead compensation circuits is difficult when the flowmeter's time response is characterized by a multiplicity of time constants. So, use of the inverted "V" type heater density function complicates the use of a phase lead circuit for improving the time response of flowmeter 200.

One preferred heater density function $\lambda(x)$ for use with flowmeter 200 is given by the arch of the cosine function so that the function $\lambda(x)$ is substantially proportional to cos $(\pi x/2L)$ for x greater than or equal to –L and x less than or equal to L, and such a function may be referred to as a "cosine-type" heater density function. Cosine-type heater density functions have a maximum value at the center (i.e., at location x=0) and decrease smoothly and continuously with increases in distance away from the center, and these functions are therefore also tapered heater density functions. Since the Fourier expansion of a cosine-type heater density function includes only a single term, the time response of a flowmeter using a cosine-type heater density function is characterized by only a single time constant and thus simplifies any phase lead circuitry used in conjunction with the flowmeter. So a cosine-type heater density function may be preferred for optimizing the time response of flowmeter 200, and an inverted "V" shaped heater density function (as shown for example in FIG. 6) may be preferred for maximizing the steady state sensitivity or accuracy of flowmeter 200. As those skilled in the art will appreciate, a cosine-type heater density function may be implemented by varying the pitch of the windings of heater coils 214, 216.

Improved flowmeter 200 has thus far been described in terms of using heater coils 214, 216 to generate the desired heater density function $\lambda(x)$. However, those skilled in the art will appreciate that the invention embraces other types of heaters that could be used in place of the non-uniformly wound heater coils 214, 216 to generate the same heater density function. For example, rather than heater coils, the heaters 214, 216 could be implemented using a thin film resistor heater, for example of the type disclosed in U.S. Pat. No. 5,398,549, by depositing the film in a helical pattern on the sensor tube 112 and varying the thickness of the film along the tube length to produce a heater that provides the desired heater density function. Further, whereas heater coils 214, 216 have been described in terms of coils that also function as heater/sensors, other heaters that do not also function as sensors may be used to generate and apply a desired non-uniform heater density function to the sensor tube, and separate temperature sensors may be used to measure the flow of fluid through the flowmeter. As another example, rather than including two heaters, flowmeters using inverted "V" type temperature distributions along the sensor tube may be constructed according to the invention that include a single concentrated heater, or "point heater", disposed around the sensor tube.

Figure 8:
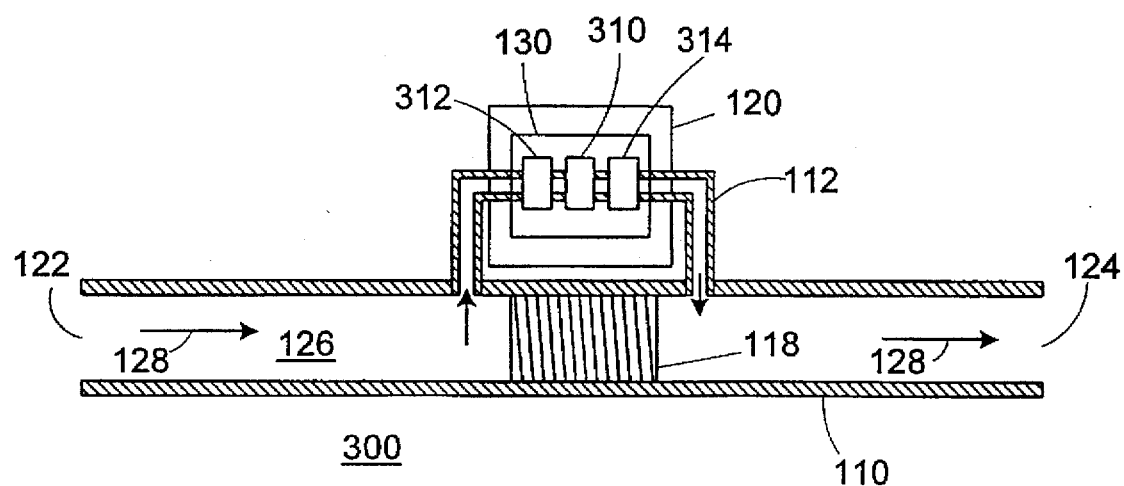
FIG. 8 shows a partial block diagram and partial radial cross-sectional view of another flowmeter constructed according to the invention.

FIG. 8 shows a partially sectional view of an embodiment of such a flowmeter 300 constructed according to the invention and including a single concentrated heater 310 rather than the two heaters 214, 216. Two additional temperature sensors 312, 314 are disposed around sensor tube 112 for sensing the temperature of tube 112 upstream and downstream, respectively, from heater 310. In this embodiment, the axial length of concentrated heater 310 is preferably relatively small compared to the axial length of sensor tube 112 so that heater 310 operates as a "point source" of heat, or as closely as possible to a point source of heat, in regard to the axial direction. So heater 310 provides a special case of a non-uniform heater density function that is essentially described by an impulse or delta function. This function is non-uniform since it does not extend over an appreciable length. So while the term non-uniform generally refers to functions that are not constant over a specified range, the term non-uniform also embraces impulse-type functions that do not extend over an appreciable range. In this embodiment, the sensor tube 112 is preferably shorter than the sensor tube used in flowmeter 200 (shown in FIG. 5).

Figure 9:
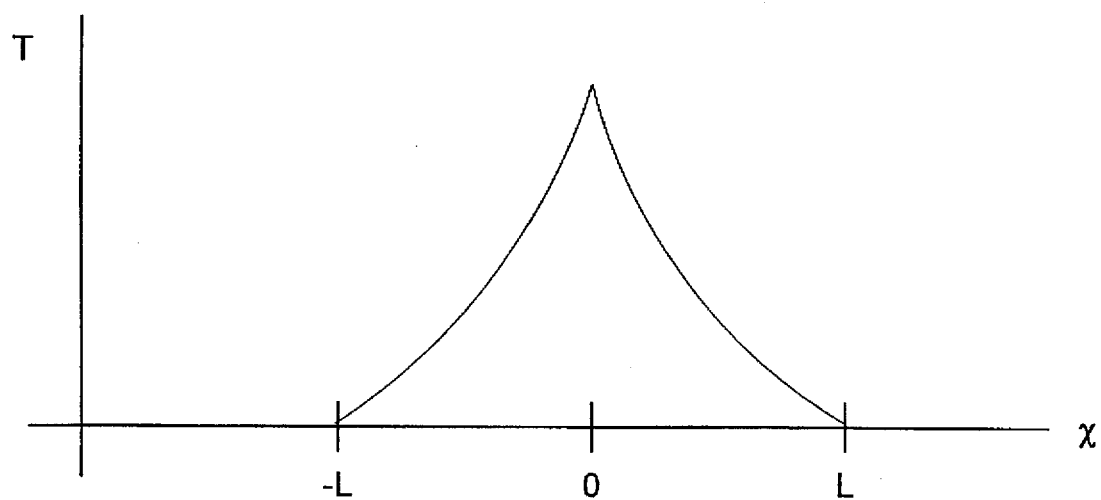
FIG. 9 shows a graph illustrating the temperature distribution of a sensor tube when a concentrated heater is applied to the tube at the origin of the X-axis.

FIG. 9 shows a graph of temperature versus distance that illustrates the reason for preferring the shorter length of sensor tube 112 in flowmeter 300. FIG. 9 shows the temperature of a sensor tube (with thermal clamps at x=+L and x=−L) as a function of distance along the tube when a point source heater applies heat to the tube at location x=0. As shown in FIG. 9, the temperature of tube 112 has a maximum value where the heater is located (i.e., at x=0) and the temperature of the tube falls off exponentially with increasing distance from the heater. As discussed above, one desired temperature distribution is characterized by an inverted "V" shape, and is substantially linear for at least large portions of the function. The distribution illustrated in FIG. 9 is characterized by an inverted "V" shape. However, the distribution is exponential rather than linear. Selecting the total length of sensor tube 112 to be relatively small compared to the rate at which the temperature falls off exponentially, essentially selects only a relatively small, substantially linear, portion of the distribution shown in FIG. 9. So the length of sensor tube 112 is preferably sufficiently small to insure that the temperature profile of tube 112 is characterized by a substantially linear inverted "V" shape.

In one example, the axial length of sensor tube 112 is 0.2 inch, and the axial length of concentrated heater 310 is 0.008 inch. Concentrated heater 310 may be implemented using any kind of heater, and need not be a temperature sensitive device, since it is only used to apply heat to tube 112 and is not used to sense the temperature of tube 112. Temperature sensors 312 and 314 are positioned respectively between the −L and zero, position, and between zero and +L positions on the tube and are only used to sense the temperature of tube 112 and are not used to apply heat to tube 112, so these devices may be implemented using any type of temperature sensor, and may for example be implemented using uniformly wound, or non-uniformly wound, temperature sensitive resistive coils.

U.S. Pat. No. 5,036,701 discloses one type of mass flowmeter including a central heater, and upstream and downstream temperature sensors, however, this patent does not disclose selecting the length of the sensor tube to be sufficiently small to insure that the temperature profile of the sensor tube is substantially linear and does not disclose the benefits of such a linear temperature profile.

The invention has been described in connection with using a heater density function λ(x) that is preferably zero or nearly zero (e.g., at locations x=−L and x=L) and is preferably characterized by a substantially linear inverted "V" shape, or is preferably characterized by the shape of an arch of a cosine function. As those skilled in the art will appreciate, maintaining the temperature at the ends of the heaters equal or nearly equal to the ambient temperature insures that flowmeter 200 will be substantially insensitive to the position of thermal clamp 120. Further, insuring that large portions of the heater density function λ(x) are linear, heightens the accuracy of flowmeter 200 by minimizing any flow independent heat transfers. While a preferred heater density function has both of these characteristics (i.e., is substantially linear and results in a tube temperature distribution equal or nearly equal to the ambient temperature near the ends of the heaters), those skilled in the art will appreciate that the invention embraces flowmeters using heater density functions that have only one of these characteristics. For example, flowmeters may be constructed according to the invention that use heaters to generate a substantially non-linear heater density function that is zero or nearly zero at the outlying ends of the heaters. Some of the heat transfer in such a flowmeter will be flow independent so the flowmeter may not be maximally accurate, however, the flowmeter will be substantially insensitive to variations in the position of thermal clamp 120, and if the heater density function is a cosine-type function the time response of the flowmeter may be optimized.

As another example, flowmeters may be constructed according to the invention that use heaters to generate a substantially linear heater density function that is not equal to zero at both ends of the heaters. Such flowmeters may not be insensitive to variations in the position of thermal clamp 120, however, they will be highly accurate since they do minimize any flow independent heat transfers. U.S. Pat. No. 5,142,907, which is assigned to the assignee of the present invention discloses a mass flowmeter that uses a linear temperature distribution. This distribution was generated by using heaters at opposite ends of the sensor tube, each heater generating a uniform heater density function and one of the heaters being hotter than the other. This flowmeter attempted to exploit the advantages of a linear temperature distribution, however, this flowmeter was impractical since it relied on precise temperature control of the two heaters at the ends of the sensor tube, and such control was difficult to achieve. This patent did not disclose that such a linear temperature distribution could be achieved by using a heater to generate a non-uniform heater density function.

Those skilled in the art will also appreciate that the invention embraces flowmeters that use heaters to generate asymmetrically shaped heater density functions, as may be generated, for example, by using two heater coils of different lengths so that one leg of an inverted "V" shape (on one side of the origin) is longer than the other leg (on the other side of the origin). Further, while the invention has been discussed in connection with using two heater coils 214, 216 that abut one another, those skilled in the art will appreciate that the invention embraces flowmeters using heaters that do not abut one another and that may generate heater density functions characterized by a trapezoidal shape having an increasing region and a decreasing region that may be joined by a central, relatively flat, region.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A mass flow transducer including:
   (A) a sensor tube defining an input end, an output end, and an interior channel extending along a longitudinal axis from said input end to said output end and permitting a fluid to flow from said input end through said channel to said output end;
   (B) heater means including a first end and a second end disposed in proximity to said sensor tube for heating at least a portion of said sensor tube, said heater means establishing a non-uniform tapered heater density function between said first and second ends along the longitudinal axis.

2. A transducer according to claim 1, wherein said heater means includes a portion in which said heater density function increases monotonically from a minimum at said first end, to a maximum located at a point between said first and second ends, and then decreases monotonically to a minimum at said second end.

3. A transducer according to claim 1, wherein said heater means includes a portion in which said heater density function increases continuously from a minimum at said first end, to a maximum located at a point between said first and second ends, and then decreases continuously to a minimum at said second end.

4. A transducer according to claim 1, wherein said heater means includes a portion in which said heater density function increases substantially linearly.

5. A transducer according to claim 1, wherein said heater means includes a portion in which said heater density function decreases substantially linearly.

6. A transducer according to claim 1, wherein a second derivative with respect to position of said heater density function is substantially equal to zero for a majority of a length between said first and second ends, said position being measured as a function of distance between said first and second ends.

7. A transducer according to claim 1, wherein said heater density function is characterized by an inverted "V" shape.

8. A transducer according to claim 1, wherein said heater density function is characterized by a cosine arch shape.

9. A transducer according to claim 1, wherein said heater density function is substantially equal to zero proximal to said first and second ends.

10. A transducer according to claim 1, wherein said heater means comprises a resistive conductor wound around a portion of said sensor tube.

11. A transducer according to claim 10, wherein said conductor is wound non-uniformly.

12. A transducer according to claim 1, further including a bypass tube defining an input port and an output port and permitting said fluid to flow from said input port to said output port, said input end coupling to said bypass tube proximal to said input port and said output end coupling to said bypass tube proximal to said output port so that a fixed portion of the fluid flowing from said input port to said output port flows through said interior channel of said sensor tube.

13. A transducer according to claim 12, further including a laminar flow element disposed in said bypass tube for restricting the flow of fluid through said bypass tube, said laminar flow element being disposed between the locations where said input end and said output end couple to said bypass tube.

14. A transducer according to claim 13, further including electronics means for applying an electrical current to said heater means and for generating a signal representative of an amount of said fluid flowing from said input end to said output end of said sensor tube.

15. A mass flow transducer including:

(A) a sensor tube defining an input end, an output end, and an interior channel extending from said input end to said output end and permitting a fluid to flow from said input end through said channel to said output end;

(B) heater means disposed in proximity to said sensor tube for heating at least a portion of said sensor tube and for generating a non-uniform heater density function and thereby generating a temperature distribution along a first portion of said sensor tube, said distribution being characterized by an inverted "V" shape and including substantially linear regions.

16. A transducer according to claim 15, wherein said heater means comprises a single heater disposed proximal to a second portion of said sensor tube, said second portion being characterized by an axial length that is substantially smaller than an axial length of said sensor tube.

17. A traducer according to claim 17, wherein said axial length of said sensor tube is sufficiently small to insure that said distribution decreases substantially linearly from said second portion of said sensor tube to the ends of said sensor tube.

18. A transducer according to claim 15, wherein said heater means comprises an upstream heater and a downstream heater, said upstream and downstream heaters being disposed proximal to respective portions of said sensor tube.

19. A transducer according to claim 18, wherein said upstream and downstream heaters comprise a resistive conductor wound around said sensor tube.

20. A transducer according to claim 19, wherein said conductor is wound non-uniformly.

21. A mass flow transducer including:

(A) a sensor tube defining an input end, an output end, and an interior channel extending from said input end to said output end and permitting a fluid to flow from said input end through said channel to said output end;

(B) heater means disposed in proximity to said sensor tube for heating at least a portion of said sensor tube, said heater means generating a tapered non-uniform heater density function along a portion of said sensor tube, said function being characterized by a cosine arch shape.

22. A transducer according to claim 21, wherein said heater means comprises an upstream heater and a downstream heater, said upstream and downstream heaters being disposed proximal to respective portions of said sensor tube.

23. A transducer according to claim 22, wherein said upstream and downstream heaters comprise a resistive conductor wound around said sensor tube.

24. A transducer according to claim 23, wherein said conductor is wound non-uniformly.

* * * * *

UNITED STATES PATENT AND TRADEMARK OFFICE
CERTIFICATE OF CORRECTION

PATENT NO. : 5,693,880

DATED : December 2, 1997

INVENTOR(S) : Thomas O. Maginnis, Jr.

It is certified that error appears in the above-identified patent and that said Letters Patent is hereby corrected as shown below:

Column 8, line 39, delete "+e,sez m+hu °+ee" and substitute therefor – m̊ --.

Claim 17, column 16, line 21, delete "traducer" and substitute therefor --transducer--; and Claim 17, column 16, line 21, after "claim" insert --16--, delete "17".

Signed and Sealed this

Thirty-first Day of March, 1998

Attest:

BRUCE LEHMAN

Attesting Officer

Commissioner of Patents and Trademarks